(12) United States Patent
Sun et al.

(10) Patent No.: US 11,966,039 B2
(45) Date of Patent: Apr. 23, 2024

(54) ELASTIC WORM GEAR ASSEMBLY AND USE THEREOF

(71) Applicant: Nantong Schmidt Opto-Electrical Technology Co. Ltd., Nantong (CN)

(72) Inventors: Yu Feng Sun, Suzhou (CN); Xue Feng Zhu, Jiangsu Province (CN)

(73) Assignee: Nantong Schmidt Opto-Electrical Technology Co. Ltd., Nantong (CN)

( * ) Notice: Subject to any disclaimer, the term of this patent is extended or adjusted under 35 U.S.C. 154(b) by 542 days.

(21) Appl. No.: 17/352,801

(22) Filed: Jun. 21, 2021

(65) Prior Publication Data

US 2022/0317435 A1 Oct. 6, 2022

(30) Foreign Application Priority Data

Apr. 2, 2021 (CN) .......................... 202110361262.0

(51) Int. Cl.
| | |
|---|---|
| *G02B 23/16* | (2006.01) |
| *F16H 1/16* | (2006.01) |
| *F16H 55/14* | (2006.01) |
| *F16H 55/22* | (2006.01) |
| *F16H 55/24* | (2006.01) |

(52) U.S. Cl.
CPC .............. *G02B 23/16* (2013.01); *F16H 1/16* (2013.01); *F16H 55/14* (2013.01); *F16H 55/22* (2013.01); *F16H 55/24* (2013.01)

(58) Field of Classification Search
CPC . G02B 23/16; F16H 1/16; F16H 55/14; F16H 55/22; F16H 55/24

USPC .................................. 33/282, 286, 290, 292
See application file for complete search history.

(56) References Cited

U.S. PATENT DOCUMENTS

| | | | | |
|---|---|---|---|---|
| 3,574,947 A | * | 4/1971 | Stepanek ............ | G01M 13/021 33/501.13 |
| 3,840,284 A | * | 10/1974 | Rand ...................... | G02B 23/00 359/430 |
| 3,942,865 A | * | 3/1976 | Rand .................... | G02B 23/165 359/430 |
| 5,689,892 A | * | 11/1997 | Beckingham ............ | G01C 1/02 33/285 |

(Continued)

FOREIGN PATENT DOCUMENTS

DE 1186296 B 1/1965

*Primary Examiner* — George B Bennett

(74) *Attorney, Agent, or Firm* — Kilpatrick Townsend & Stockton LLP

(57) ABSTRACT

A mount for a telescope incorporates a worm gear assembly comprising: a worm wheel connected to a telescope holder, such that movement of the worm wheel about a wheel axis causes movement of the holder about the wheel axis; and a worm shaft having a worm body extending in a longitudinal direction and a thread extending in a spiral on the worm body around a worm axis orthogonal to the wheel axis. The worm shaft is supported by a base for rotational movement. The worm wheel comprises a plurality teeth for engaging the worm shaft thread, so that rotation of the worm shaft about the worm axis causes corresponding rotation of the worm wheel, and corresponding relative rotation between the holder and the base, about the wheel axis. The wheel body defines a plurality of elasticity-enhancing cutouts spaced apart from the wheel axis and extending through the wheel body.

20 Claims, 4 Drawing Sheets

(56) References Cited

U.S. PATENT DOCUMENTS

| | | | |
|---|---|---|---|
| 10,638,094 B2* | 4/2020 | Henion | B60R 11/04 |
| 11,320,644 B2* | 5/2022 | Sun | F16M 13/022 |
| 11,441,665 B2* | 9/2022 | Kawamura | F16H 55/24 |
| 11,635,126 B2* | 4/2023 | Moser | F16H 19/005 |
| | | | 74/29 |
| 2017/0102208 A1* | 4/2017 | Plumb | F41G 1/38 |
| 2019/0010614 A1 | 4/2019 | Sung | |
| 2020/0218056 A1 | 7/2020 | Sun et al. | |

* cited by examiner

ELASTIC WORM GEAR ASSEMBLY AND USE THEREOF

RELATED APPLICATIONS

This application claims the benefit of the priority of Chinese application No. 2021103612620 filed 2 Apr. 2021, which is hereby incorporated herein by reference.

TECHNICAL FIELD

The present invention relates to a worm gear assembly. Some embodiments provide an elastic worm gear assembly. Some embodiments provide an elastic worm gear assembly for a mount for a telescope or other optical instrument. Some embodiments provide mounts for a telescope or other optical instrument which incorporate an elastic worm gear assembly.

BACKGROUND

Several movable mounts exist for telescopes or other optical instruments. Two main types of telescope mounts are equatorial mounts and altitude-azimuthal mounts. Each of these mounts is configured so that a telescope (supported by the mount) can be moved on two orthogonal axes.

Equatorial mounts compensate for Earth's rotation and provide single-axis tracking of celestial objects. For example, the German equatorial mount typically has a right ascension shaft, a declination shaft, and a counterweight shaft. The right ascension shaft is rotatable relative to the base about a right ascension axis. The declination shaft is rotatable relative to the right ascension shaft about a declination axis. The declination axis is orthogonal to the right ascension axis. The counterweight shaft is mounted to one end of the right ascension shaft and extends from the right ascension shaft along a counterweight axis that is co-linear with the declination axis.

Altitude-azimuthal mounts, also referred to as altazimuth mounts or alt-az mounts, rotate an optical instrument about two perpendicular axes: an azimuthal axis and an altitude axis. The orientation of an optical instrument mounted on an alt-az mount corresponds to a set of coordinates referred to as the alt-az coordinates. The alt-az coordinates are typically expressed in degrees of altitude and azimuth. Altitude represents the angular orientation of an optical instrument about the altitude axis relative to the horizon. Altitude is typically expressed in a range of −90° to 90°, with 0° representing the horizon. The point at 90° is a point that is directly overhead for an observer. The point directly overhead is called the zenith. Azimuth represents the angular orientation of an optical instrument about the azimuthal axis and is expressed in a range of 0° to 360°. Typically, azimuth is selected to represent the true compass (as opposed to magnetic) heading towards a point on the horizon and is measured eastwardly from the North celestial pole.

Worm gear assemblies are often used in both equatorial mounts and altitude-azimuthal mounts to enable rotation of a mounted telescope. A worm gear assembly includes a worm shaft (also referred to as a worm and a worm screw) and a worm wheel (also referred to as a worm gear). The worm shaft and the worm wheel cooperate with one another, so that rotation of the worm shaft about a worm axis causes corresponding rotation of the worm wheel about a wheel axis that is generally orthogonal to the worm axis. In a motorized mount, a motor typically acts on a worm shaft, which in turn cooperates with a worm wheel. In practice, the mechanical engagement between the worm wheel and the worm shaft is often too loose or too tight. When the engagement is too loose, the orientation of a mounted optical instrument may not be adjusted with a high precision. When the engagement is too tight, it may be difficult to turn the worm shaft and this may result in increased friction and associated wear and tear of the worm gear assembly.

There is a general desire for a worm gear assembly for a mount for a telescope or other optical instrument that allows ease of operation, prevents pre-mature wear and tear, and/or enables precise adjustment of a mounted optical instrument.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a mount for a telescope or other optical instrument. The mount comprises a holder for supporting an optical instrument mounted thereto, the holder movable relative to a base about a wheel axis by operation of a worm gear assembly. The worm gear assembly comprises: a worm wheel rigidly connected to the holder, such that movement of the worm wheel about the wheel axis causes corresponding movement of the holder about the wheel axis; and a worm shaft comprising a worm body extending in a longitudinal direction and a thread extending in a spiral on the worm body around a longitudinally oriented worm axis that is orthogonal to the wheel axis, the worm shaft supported by the base for rotational movement about the worm axis. The worm wheel comprises a generally disc-shaped wheel body comprising a plurality of radially extending and circumferentially spaced apart teeth at a radially outermost peripheral surface for engaging the thread of the worm shaft, so that rotation of the worm shaft about the worm axis causes, by engagement of the teeth and the thread, corresponding rotation of the worm wheel about the wheel axis and corresponding relative rotation of the holder and the base about the wheel axis. The wheel body is shaped to define a plurality of elasticity-enhancing cutouts spaced apart from the wheel axis and extending through the wheel body in directions parallel to the wheel axis.

Another aspect of the invention provides a worm gear assembly for use with a mount for a telescope or other optical instrument comprising a holder for supporting an optical instrument mounted thereto, where operation of the worm gear assembly enables the holder to move relative to a base about a wheel axis. The worm gear assembly comprises: a worm wheel rigidly connected to the holder, such that movement of the worm wheel about the wheel axis causes corresponding movement of the holder about the wheel axis; and a worm shaft comprising a worm body extending in a longitudinal direction and a thread extending in a spiral on the worm body around a longitudinally oriented worm axis that is orthogonal to the wheel axis, the worm shaft supported by the base for rotational movement about the worm axis. The worm wheel comprises a generally disc-shaped wheel body comprising a plurality of radially extending and circumferentially spaced apart teeth at a radially outermost peripheral surface for engaging the thread of the worm shaft, so that rotation of the worm shaft about the worm axis causes, by engagement of the teeth with the thread, corresponding rotation of the worm wheel about the wheel axis and corresponding relative rotation of the holder and the base about the wheel axis. The wheel body is shaped to define a plurality of elasticity-enhancing cutouts spaced apart from the wheel axis and extending through the wheel body in a directions parallel to the wheel axis.

Each one of the elasticity-enhancing cutouts may be defined, at least in part, by a pair of continuous cut-out defining surfaces. The continuous cut-out defining surfaces may meet at a first discontinuous corner. The continuous cut-out defining surfaces may meet at the first discontinuous corner and at a second discontinuous corner.

The continuous cut-out defining surfaces may be continuously curved. The continuous cut-out defining surfaces may be arcuate. The continuous cut-out defining surfaces may comprise different radii of curvature. The continuous cut-out defining surfaces may comprise different centers of curvature.

The elasticity-enhancing cutouts may each comprise a generally crescent-shaped cross section in a cross-sectional direction orthogonal to the wheel axis.

Each one of the elasticity-enhancing cutouts may be defined by a cut-out defining surface. The cut-out defining surface may comprise a first arcuate portion and a second arcuate portion connected to the first arcuate portion by a pair of spaced apart discontinuities. The first arcuate portion and the second arcuate portion may comprise different centers of curvature. The first arcuate portion and the second arcuate portion may comprise different radii of curvature.

Each one of the elasticity-enhancing cutouts may be defined, at least in part, by a plurality of continuous cut-out defining surfaces. At least one pair of the plurality of continuous cut-out defining surfaces may meet at a discontinuous corner. The continuous cut-out defining surfaces may be arcuate.

The elasticity-enhancing cutouts may each comprise a generally triangular cross section in a cross-sectional direction orthogonal to the wheel axis.

Each one of the elasticity-enhancing cutouts may be defined, at least in part, by four continuous cut-out defining surfaces. Two of the four continuous cut-out defining surfaces may extend radially from the wheel axis and the other two of the four continuous cut-out defining surfaces may extend circumferentially about the wheel axis.

The continuous cut-out defining surfaces may each extend in a direction that is parallel to the wheel axis.

The elasticity-enhancing cutouts may be shaped or located such that any notional radial line between the wheel axis and the teeth intersects at least one pair of continuous cut-out defining surfaces has one or more discontinuities therebetween. At least one notional radial line may intersect a second pair of continuous cut-out defining surfaces having one or more discontinuities therebetween.

The elasticity-enhancing cutouts may be positioned at uniform angular intervals about the wheel axis.

A ratio of the volume of the elasticity-enhancing cutouts to the volume of the worm wheel may be between about 15% and about 45%, thereby providing a wheel body having a mass that is about 15% to about 45% lower than a mass that the wheel body would have if made from solid material.

The base may be movable relative to a base support component and the worm shaft may be supported by the base such that movement of the base relative to the base support component causes corresponding movement of the worm axis and the wheel axis, while maintaining the orthogonality therebetween.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Figure 1:
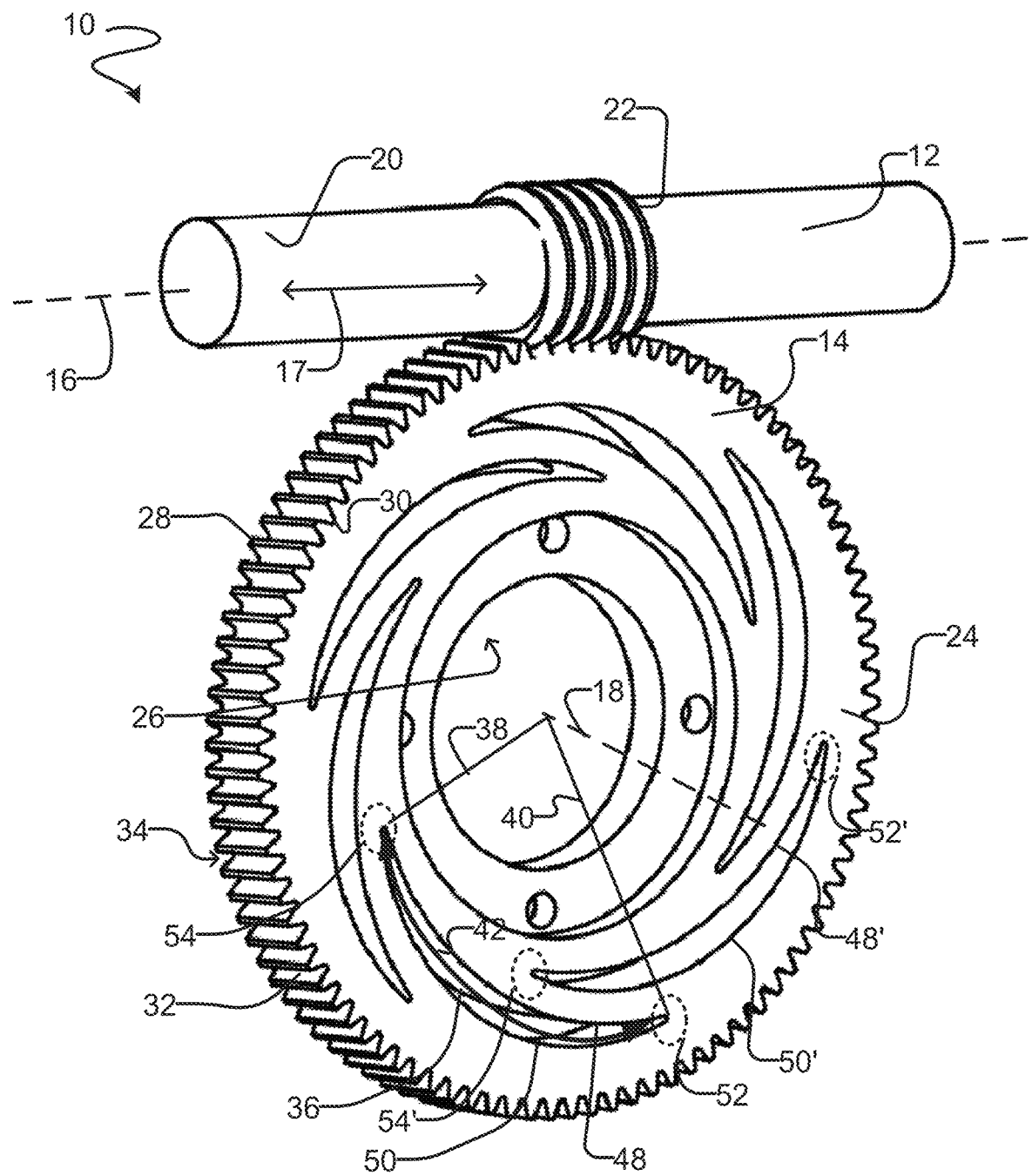
FIG. 1 is a perspective view of an example embodiment of a worm gear assembly according to the present invention.

An elastic worm gear assembly is described herein. The elastic worm gear assembly may be used in a movable mount for a telescope or other optical instrument. The elastic worm gear assembly comprises a worm shaft and a worm wheel that is mounted for operational engagement with the worm shaft such that rotation of the worm shaft about a worm axis causes corresponding rotation of the worm wheel about a wheel axis that is orthogonal to the worm axis. The worm shaft comprises a worm body extending in a longitudinal direction (generally parallel to the worm axis) and a thread extending in a spiral on an external surface of the worm body around the worm axis. The worm wheel comprises a generally disc-shaped wheel body comprising a plurality of radially extending and circumferentially spaced apart teeth at a radially outermost peripheral surface for engaging the thread of the worm shaft. The wheel body is shaped to define a plurality of elasticity-enhancing cutouts spaced apart from the wheel axis and extending through the wheel body in a direction parallel to the wheel axis. The elasticity-enhancing cutouts confer enhanced elasticity to the wheel body (relative to a solid wheel body), so that the worm wheel is more resiliently (elastically) deformable (relative to a solid wheel body) in a radial direction toward the wheel axis. In some embodiments, the elasticity-enhancing cutouts confer enhanced elasticity to the wheel body so that the worm wheel is more resiliently (elastically) deformable (relative to a solid wheel body) in other direction(s), such as in a direction parallel to the wheel axis and/or a circumferential direction. In some embodiments, a ratio of the volume of the elasticity-enhancing cutouts to the volume of the worm wheel is between about 25% and about 45%, thereby providing a wheel body having a mass that is about 25% to about 45% lower than a mass that the wheel body would have if made from solid material. When the elastic worm gear assembly is incorporated in a telescope mount, the elasticity-enhancing cutouts help to achieve an engagement between the elastic worm wheel and the worm shaft that is relatively close to an ideal engagement (e.g. neither too tight nor too loose) when compared to a conventional worm gear assembly, to thereby enable precise adjustment of a telescope mounted on the telescope mount.

As used herein, unless the context dictates otherwise, the terms "elastic" and "resiliently deformable" mean that a worm wheel is able to return to its original shape after the worm wheel is deformed by an applied force and the applied force is subsequently removed.

As used herein, unless the context dictates otherwise, the terms "about" and "approximately" mean plus and minus 5%.

As used herein, unless the context dictates otherwise, the term "generally" means in general terms. For example, a "generally disc-shaped wheel body" means that the wheel body has an overall shape of a disc, but it does not need to be a perfectly circular in cross-sectional shape.

As used herein, unless the context dictates otherwise, the term "continuity" or "continuous" or "continuously" means a smooth transition. In contrast, the term "discontinuity" or "discontinuous" or "discontinuously" means a non-smooth transition. For example, an elasticity-enhancing cutout may be defined by a pair of continuous cutout defining surfaces wherein the continuous cutout defining surfaces are connected (or meet) at discontinuous (i.e. non-smooth, characterized by a sharp angle) corners, where the radii of curvature of such discontinuous corners is less than 2 cm or, in some embodiments, less than 1 cm or, in some embodiments, less than 5 mm or, in some embodiments, less than 2.5 mm.

The following description sets forth specific details in order to provide a more thorough understanding to persons skilled in the art. It describes:
- a worm gear assembly comprising an elastic worm wheel; and
- a handheld alt-azimuth mount comprising the worm gear assembly.

However, well known elements may not have been shown or described in detail to avoid unnecessarily obscuring the disclosure. Accordingly, the description and drawings are to be regarded in an illustrative, rather than a restrictive, sense.

Worm Gear Assembly

FIG. 1 shows a perspective view of a worm gear assembly 10 comprising a worm shaft 12 and an elastic worm wheel 14. Worm shaft 12 and elastic worm wheel 14 are operably engaged.

Focusing on the structural features of worm shaft 12, worm shaft 12 comprises a worm body 20 extending in a longitudinal direction 17. At least a portion of worm body 20 is circumscribed by a single thread 22. Single thread 22 extends in a spiral about a longitudinally-oriented worm axis 16 on an outer surface of worm shaft 12. Worm axis 16 extends in longitudinal direction 17 and is aligned with a central axis of worm body 20. In the illustrated embodiment, single thread 22 is a V-type thread with a V-shaped cross section. In other embodiments, worm body 20 may be wrapped by multiple threads. Worm body 20 may be wrapped by a non-V-type thread. The entire worm body 20 may be wrapped by a thread. Worm shaft 12 may be a single enveloped worm or a double enveloped worm. Worm shaft 12 may have threads that form a single start or multiple starts. Worm shaft 12 may be integrally formed and can be made of any suitable materials. For example, worm shaft 12 may be entirely made of metal or plastic. Worm body 20 and thread 22 may be made of different materials, for example with worm body 20 made of metal and thread 22 made of plastic. Overall, worm shaft 12 can be any threaded worm known in the art as long as worm shaft 12 can operably engage worm wheel 14, so that torque can be transmitted from worm shaft 12 to worm wheel 14.

With respect to worm wheel 14, worm wheel 14 comprises a generally disc-shaped wheel body 24. Disc-shaped wheel body 24 of the illustrated embodiment has a central fitting hole portion 26 although in other embodiments, central fitting hole portion 26 may be omitted. Disc-shaped wheel body 24 comprises a plurality of radially extending and circumferentially spaced-apart teeth 28 at a radially outermost peripheral surface 32. Space 34 between adjacent teeth 28 is shaped for engaging thread 22 of worm shaft 12, so that rotation of worm shaft 12 about worm axis 16 causes corresponding rotation of worm wheel 14 about a wheel axis 18. Wheel axis 18 is orthogonal to worm axis 16.

Wheel body 24 is shaped to define a plurality of elasticity-enhancing cutouts 36 which confer a degree of elasticity to wheel body 24, so that worm wheel 14 is more resiliently (elastically) deformable (relative to a solid wheel body) in a radial direction towards wheel axis 18. In some embodiments, the elasticity-enhancing cutouts confer enhanced elasticity to wheel body 24 so that worm wheel 14 is more resiliently (elastically) deformable (relative to a solid wheel body) in other direction(s), such as in directions parallel to the wheel axis and/or circumferential directions. Elasticity-enhancing cutouts 36 may be spaced apart from wheel axis 16. Elasticity-enhancing cutouts 36 may extend through wheel body 24 in a direction parallel to wheel axis 16.

To provide a desired level of elasticity while maintaining a desired level of physical rigidity, in some embodiments, the ratio of the volume of elasticity-enhancing cutouts 36 to the volume of worm wheel 14 is between about 15% and about 45%, thereby providing a wheel body having a mass that is about 15% to about 45% lower than a mass that the wheel body would have if made from solid material. The ratio may be any value between about 15% and about 45%, e.g. 17%, 20%, 25%, 28%, 31%, 33%, 35%, 37%, 39%, 41%, and 43%. The ratio of the volume of elasticity-enhancing cutouts 36 to the volume of worm wheel 14 may change depending on the shape and placement of elasticity-enhancing cutouts 36.

Elasticity-enhancing cutouts 36 can have any suitable shapes and dimensions. Also, elasticity-enhancing cutouts 36 can be arranged in any suitable placement. The shapes, dimensions, and/or placement of elasticity-enhancing cutouts 36 may confer a level of elasticity to wheel body 24, so that worm wheel 14 is resiliently deformable in a radial direction towards wheel axis 16.

Focusing on the currently desired shapes of elasticity-enhancing cutouts 36, elasticity-enhancing cutouts 36 may be an oblong shape, a boomerang shape, a rectangular shape, or a triangular shape. Elasticity-enhancing cutouts 36 may be identical to or different from each other.

In the illustrated embodiment, elasticity-enhancing cutouts 36 have the same shape and dimensions. For brevity, only one elasticity-enhancing cutout 36 is described in detail below. Elastic-enhancing cutout 36 is curved and forms a generally crescent shape in a cross-sectional direction orthogonal to wheel axis 18. Elasticity-enhancing cutout 36 extends from an inner radius 38 to an outer radius 40 in an arcuate direction 42. Elasticity-enhancing cutout 36 is defined by a pair of continuous cut-out defining surfaces 48, 50. Continuous cut-out defining surfaces 48, 50 each extend through wheel body 20 in a direction parallel to wheel axis 18, although in some other embodiments, continuous cut-out defining surfaces 48, 50 may extend through wheel body 20 in a direction that intersects wheel axis 18. Continuous cut-out defining surfaces 48, 50 are each arcuate, smooth and free from sharp edges. Continuous cut-out defining surfaces 48, 50 of the illustrated embodiment have different centers of curvature and different radii of curvature, although this is not necessary. Continuous cut-out defining surfaces 48, 50 are connected and meet at discontinuous corners 52, 54. The radii of curvature at discontinuous corners 52, 54 may be less than 2 cm or, in some embodiments, less than 1 cm or, in some embodiments, less than 5 mm or, in some embodiments, less than 2.5 mm.

In terms of the placement of elasticity-enhancing cutouts 36, the placement may be impacted by the shapes and dimensions of elasticity-enhancing cutouts 36. This is because the shapes, dimensions, and placement of elasticity-enhancing cutouts 36 function together to confer a desired level of elasticity to wheel body 24 and worm wheel 14.

In the illustrated embodiment, elasticity-enhancing cutouts 36 are located (and shaped) such that any notional radial line between wheel axis 18 and teeth 28 intersect at least one pair of continuous cut-out defining surfaces 48, 50 having one or more discontinuities 52, 54 therebetween. Further, elasticity-enhancing cutouts 36 are located (and shaped) such that at least one notional radial line intersects a second pair of continuous cut-out defining surfaces 48', 50' having one or more discontinuities therebetween 52', 54'. In other words, elasticity-enhancing cutouts 36 are positioned in a staggered manner, so that one or more pairs of adjacent elasticity-enhancing cutouts 36 overlap in some degree in a circumferential direction and are separated in a radial direction.

In the illustrated embodiment, elasticity-enhancing cutouts 36 are spaced apart at a uniform angular interval about wheel axis 18.

Figure 2A:
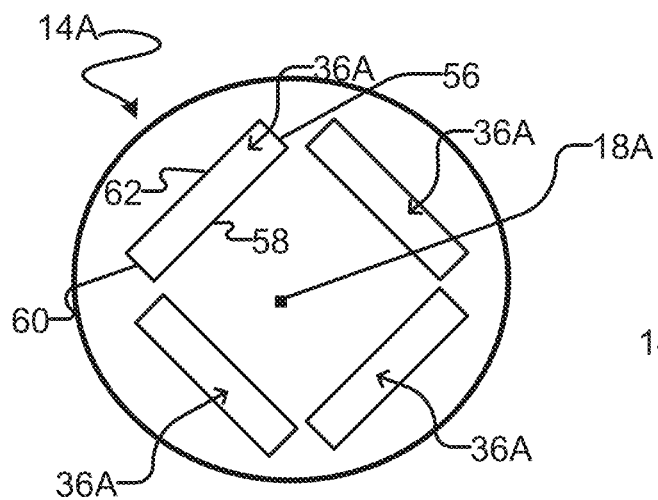
FIGS. 2A-C each show a top view of an example embodiment of an elastic worm wheel.
Figure 2B:
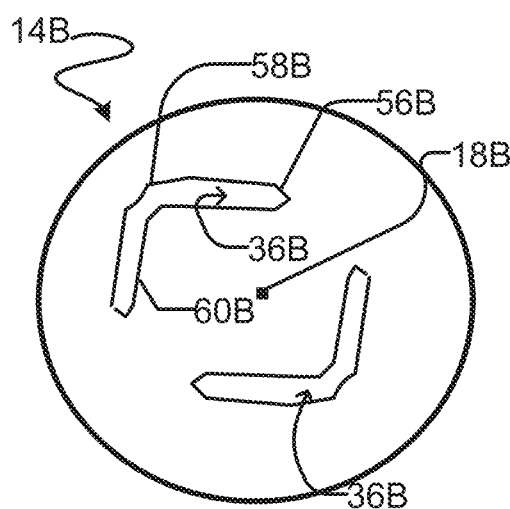
Figure 2C:
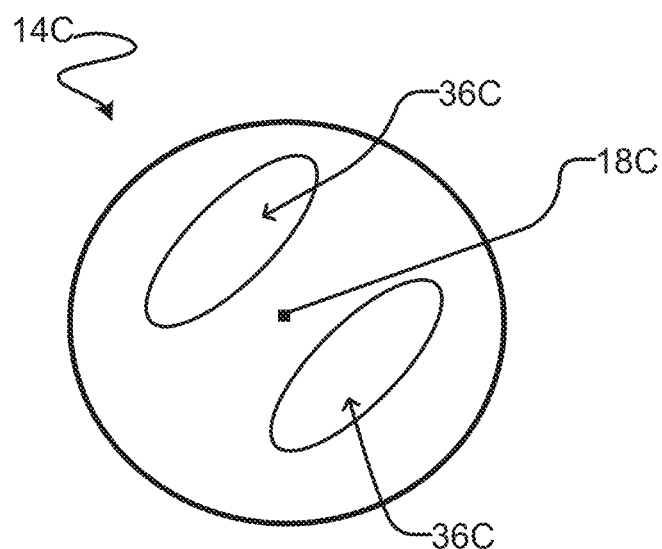

Some other embodiments of elasticity-enhancing cutouts 36 are schematically shown in FIG. 2A-C. FIG. 2A shows a worm wheel 14A having a plurality of elasticity-enhancing cutouts 36A. Each one of elasticity-enhancing cutouts 36A is defined by four continuous cut-out defining surfaces 56, 58, 60, 62. Elasticity-enhancing cutouts 36A comprises a rectangular cross section taken in a cross-sectional direction orthogonal to wheel axis 18A. In other words, each one of elasticity-enhancing cutouts 36A is defined by four continuous surfaces 56, 58, 60, 62. FIG. 2B shows a worm wheel 14B having a plurality of elasticity-enhancing cutouts 36B. Each one of elasticity-enhancing cutouts 36B is defined by a continuous cut-out defining surface 56B. Continuous cut-out defining surface 56B comprises a first curved portion 58B and a second curved portion 60B connected to first curved portion 58B. First curved portion 58B and second curved portion 60B have the same center of curvature although they have different radii of curvature. Elasticity-enhancing cutouts 36B each comprise a generally boomerang-shaped cross section in a cross-sectional direction orthogonal to the wheel axis 18B. FIG. 2C shows a worm wheel 14C having a plurality of elasticity-enhancing cutouts 36C. Each one of elasticity-enhancing cutouts 36C comprises an oblong section taken in a cross-sectional direction orthogonal to wheel axis 18C. In other words, elasticity-enhancing cutouts 36C each is defined by a continuous cut-out defining surface. A person skilled in the art would appreciate that elasticity-enhancing cutouts may have any suitable shapes and dimensions that provide worm wheel 14 with the desired elasticity properties. Other possible embodiments include elasticity-enhancing cutouts defined by three continuous cut-out defining surfaces. The three continuous cut-out defining surfaces may be curved and may meet at three discontinuous corners. The elasticity-enhancing cutouts each may comprise a generally triangular cross section in a cross-sectional direction orthogonal to the wheel axis.

Worm wheel 14 may be integrally formed and can be made of any suitable materials. In some embodiments, worm wheel 14 is entirely made of metal or plastic. In some other embodiments, worm wheel body 24 and teeth 32 are made of different materials. For example, worm wheel body 24 may be made of metal and teeth 32 may be made of plastic.

In operation, worm shaft 12 and elastic worm wheel 14 are mounted in operational engagement with one another, so that when worm shaft 12 rotates about worm axis 16, worm shaft 12 acts on and rotates worm wheel 14 about wheel axis 18. Worm rotation axis 16 and wheel rotation axis 18 are oriented perpendicular to each other and do not intersect. Thread 22 engages with teeth 32, so that the turning actions of worm shaft 12 act on and drive worm wheel 14. Worm wheel 14 is resiliently (elastically) deformable in a radial direction towards wheel axis 18 (e.g. more elastically deformable than a solid worm wheel). In some embodiments, the elasticity-enhancing cutouts 36 confer enhanced elasticity to wheel body 24, so that worm wheel 14 is more resiliently (elastically) deformable (relative to a solid wheel body) in other direction(s) such as in directions parallel to the wheel axis and/or circumferential directions. When thread 22 is received space 34 between adjacent teeth 32, worm shaft 12 may press on worm wheel 14, so that worm wheel 14 is elastically compressed inwardly towards wheel axis 18. The compression force acts on outer peripheral surface 30, thereby causing worm wheel 14 to deform radially and inwardly. The resilient deformation of worm wheel 14 promotes engagement and minimizes backlash between worm 12 and worm wheel 14 with worm 14 rotating about worm rotation axis 16.

Handheld Alt-Az Mount Comprising Elastic Worm Gear Assembly

Worm gear assembly 10 can be incorporated in a mount for a telescope or other optical instrument. When incorporated in a mount, worm gear assembly 10 enables precise adjustment of a telescope mounted on the mount. This is because elasticity-enhancing cutouts 36 and the corresponding resilient deformation of worm wheel 14 encourage an ideal engagement between elastic worm wheel 14 and worm shaft 12 that is neither too tight nor too loose (e.g. mitigating backlash). A person skilled in the art would appreciate that the mount in which worm gear assembly is used can be any type of movable mount for telescopes or other optical instruments, including equatorial mounts and altitude-azimuthal mounts.

An example embodiment of a mount 100 that incorporates worm gear assembly 10 is shown in FIGS. 3-6. Mount 100 is a handheld alt-az mount, where precise adjustment of the altitude-azimuthal coordinates can be a challenge. The deployment of worm gear assembly 10 in handheld alt-az mount 100 facilitates relatively accurate altitude and/or azimuth adjustment (relative to a mount incorporating a solid worm gear assembly), because of the resilient deformability of worm wheel 14.

Handheld alt-az mount 100 comprises a holder 106 for supporting an optical instrument (not shown) mounted thereto. Holder 106 is rotationally movable relative to a base 108 about an altitude axis 110 and an azimuth axis 112 by operation of an altitude-rotation mechanism 102 and an azimuth-rotation mechanism 104, respectively. The structural features of altitude-rotation mechanism 102 and azimuth-rotation mechanism 104 may be substantially the same in terms of their worm gear assemblies 10. For brevity, only altitude-rotation mechanism 102 is described in detail below.

Figure 3:
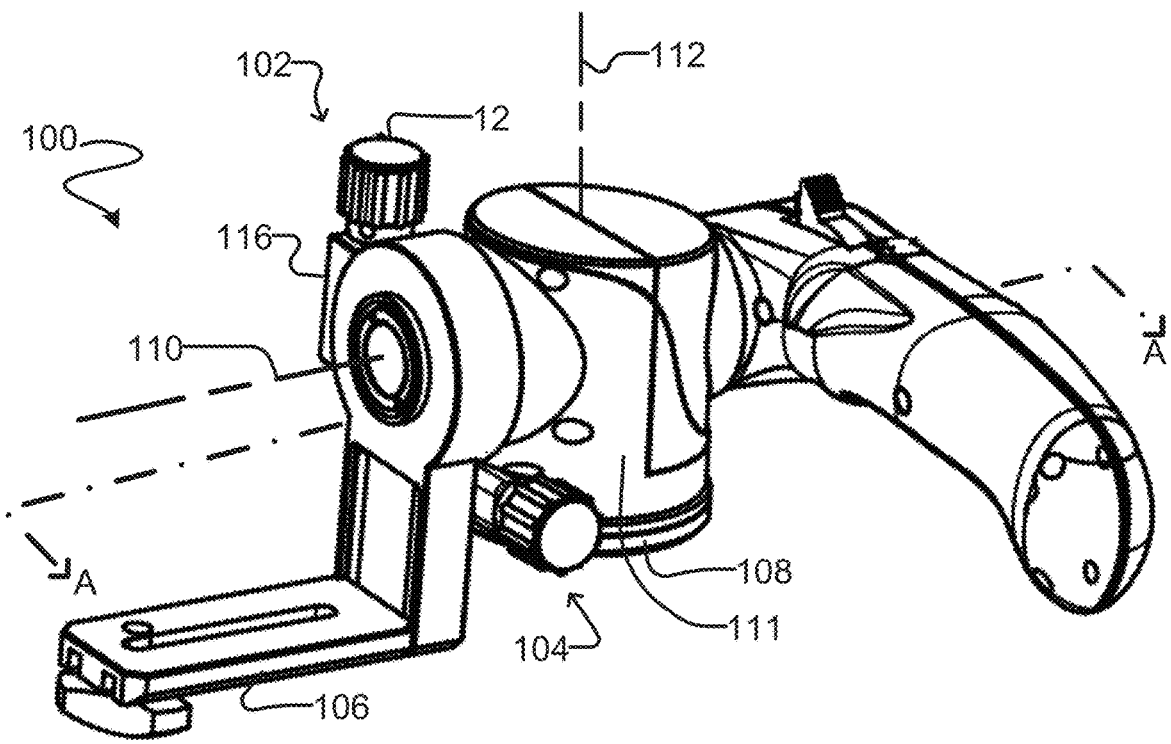
FIG. 3 is a perspective view of an alt-azimuth mount comprising the elastic worm gear assembly of FIG. 1.

As shown in FIGS. 3-6, altitude-rotation mechanism 102 comprises worm gear assembly 10 that includes worm shaft 12 rotatable about worm axis 16 and worm wheel 14 rotatable about wheel axis 18. Worm shaft 12 is supported for rotatable motion about worm axis 16 (FIG. 4) in a sleeve 116 (FIG. 3). Sleeve 116 may form part of holder support component 111 or may be rigidly mounted to holder support component 111. Holder support component 111 supports holder 106 and rotates with holder 106 about azimuth axis 112 by the action of azimuth-rotation mechanism 104. However, holder 106 rotates relative to holder support component 111 about altitude axis 110 by the action of altitude-rotation mechanism 102, as explained in more detail below.

Figure 4:
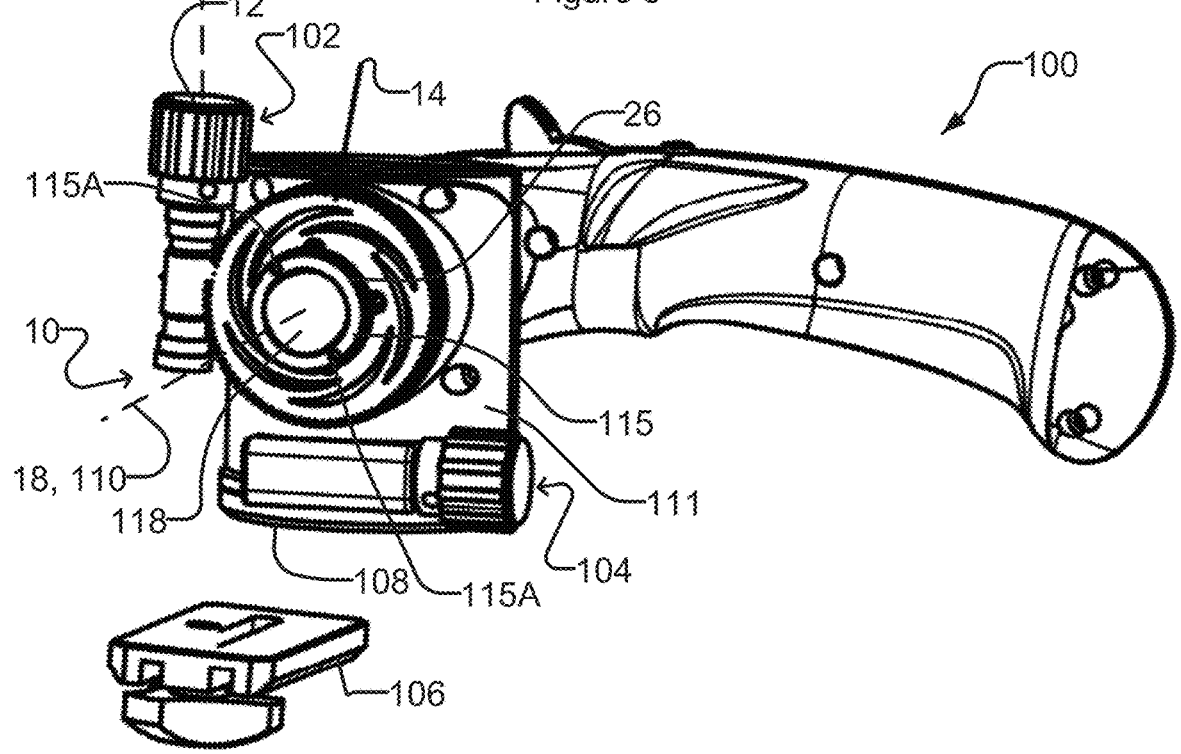
FIG. 4 is a perspective, partial view of the alt-az mount of FIG. 3.
Figure 5:
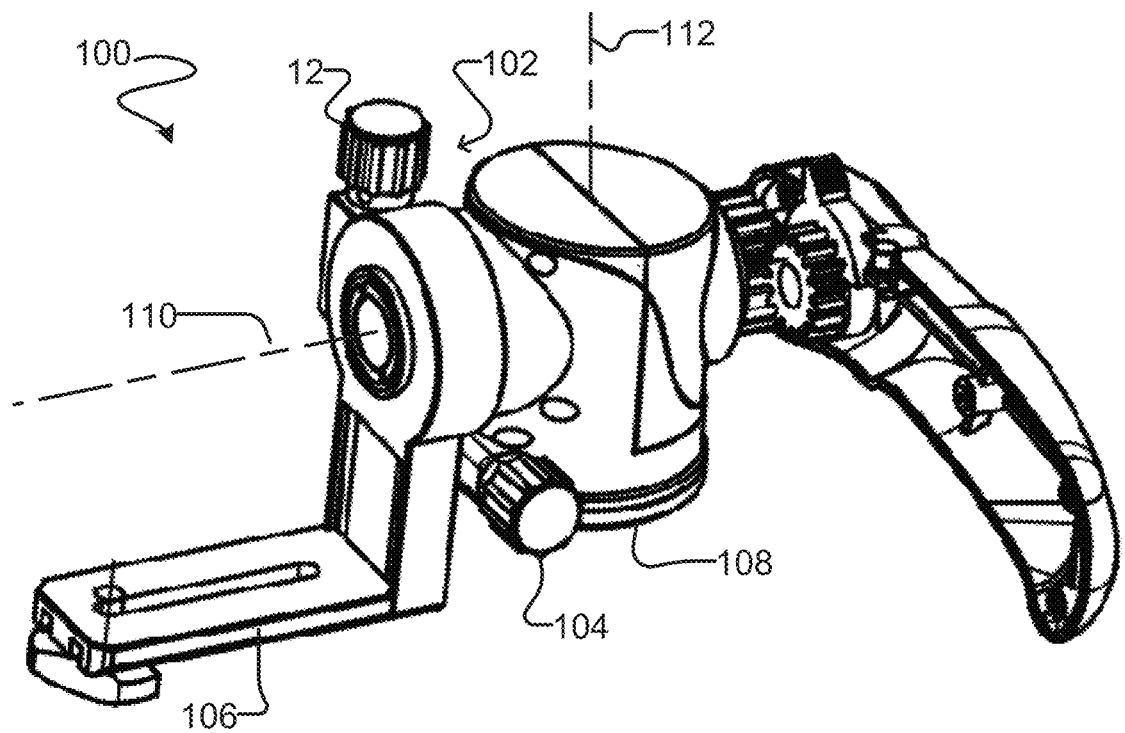
FIG. 5 is a perspective view of the alt-az mount of FIG. 3 with an exposed handle to show the elements housed therein.
Figure 6:
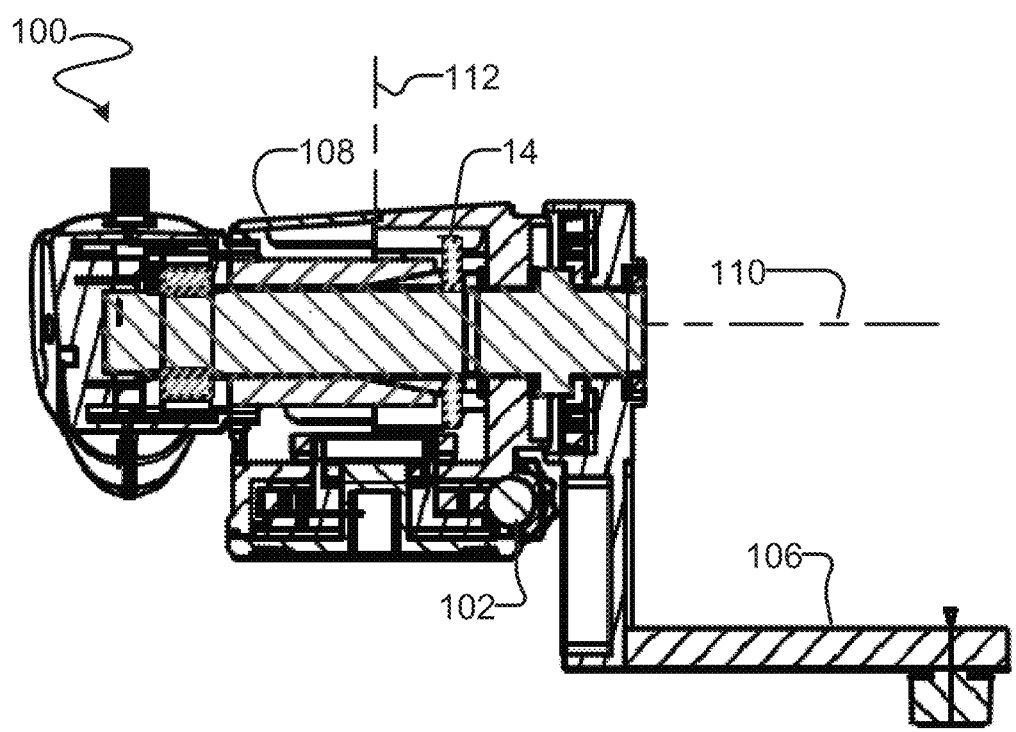
FIG. 6 is a cross-sectional view of the alt-az mount of FIG. 3 taken along the line A-A.

As shown best in FIG. 4, worm shaft 12 of altitude-rotation mechanism 102 is rotatable about its worm axis 16 within sleeve 116. Sleeve 116 is located such that rotation of worm shaft 12 causes corresponding rotation of worm wheel 14 about wheel axis 18 which may be collinear with altitude axis 110. Worm wheel 114 is rotatably supported on rod bearing 118 of holder support component 111, such that worm wheel 114 is rotatable about altitude axis 110 (wheel axis 18) by bearing on the surface of rod bearing 118. In the illustrated embodiment, worm wheel 114 comprises a keyed collar 115 having a pair of key slots 115A. Holder 106 fits over keyed collar 115, so that corresponding key protrusions (not shown) of holder 106 fit into key slots 115A. In this manner, rotation of worm shaft 12 about worm axis 16 (e.g. by a user in some embodiments or by a suitably configured motor in some embodiments) causes corresponding rotation of worm wheel 14 about altitude axis 110 (wheel axis 18) and when worm wheel 14 rotates, keyed collar 115 rotates which in turn causes holder 106 to rotate about altitude axis 110 by the engagement of the key protrusions of holder 106 into key slots 115A. As discussed above, worm wheel 14 comprises cutouts 36 (not specifically enumerated in FIGS. 4-6) which provide a relatively high degree of elastic deformability to worm wheel 14 (relative to a solid worm wheel) and the corresponding benefits to altitude-rotation mechanism 102 (as discussed elsewhere herein)

Persons skilled in the art will appreciate that altitude-rotation mechanism 102 may be constructed with other specific configurations which use worm wheel assembly 10 to facilitate rotational movement of one component (e.g. holder 106) relative to another component (e.g. holder support component 111) about an altitude axis 110 and which take advantage of worm wheel assembly 10 and deformable worm wheel 14. Persons skilled in the art will appreciate that an azimuth-rotation mechanism 104 may be similarly constructed with similar configurations which use worm wheel assembly 10 to facilitate rotational movement of one component (e.g. holder support component 111) relative to another component (e.g. base 108) about an azimuth axis 112 and which take advantage of worm wheel assembly 10 and deformable worm wheel 14.

In some embodiments, mount 100 may be an equatorial mount comprising a holder for supporting an optical instrument mounted thereto, the holder rotationally movable relative to a base about right ascension and declination axes, by corresponding right ascension and declination rotation mechanisms where one or both of the right ascension and declination rotation mechanisms comprises a worm gear assembly 10 having a deformable worm wheel 14.

In some embodiments, worm gear assembly 10 may be operated by a motor. For example, the rotation of worm shaft 12 may be driven by a motor.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

The invention claimed is:

1. A mount for a telescope or other optical instrument comprising:
    a holder for supporting an optical instrument mounted thereto, the holder movable relative to a base about a wheel axis by operation of a worm gear assembly;
    the worm gear assembly comprising:
        a worm wheel rigidly connected to the holder, such that movement of the worm wheel about the wheel axis causes corresponding movement of the holder about the wheel axis;
        a worm shaft comprising a worm body extending in a longitudinal direction and a thread extending in a spiral on the worm body around a longitudinally oriented worm axis that is orthogonal to the wheel axis, the worm shaft supported by the base for rotational movement about the worm axis;
        the worm wheel comprising a generally disc-shaped wheel body comprising a plurality of radially extending and circumferentially spaced apart teeth at a radially outermost peripheral surface for engaging the thread of the worm shaft, so that rotation of the worm shaft about the worm axis causes, by engagement of the teeth and the thread, corresponding rotation of the worm wheel about the wheel axis and corresponding relative rotation of the holder and the base about the wheel axis; and
        the wheel body shaped to define a plurality of elasticity-enhancing cutouts spaced apart from the wheel axis and extending through the wheel body in directions parallel to the wheel axis.

2. A mount as defined in claim 1, wherein each one of the elasticity-enhancing cutouts is defined, at least in part, by a pair of continuous cut-out defining surfaces.

3. A mount as defined in claim 2, wherein the continuous cut-out defining surfaces meet at a first discontinuous corner.

4. A mount as defined in claim 3, wherein the continuous cut-out defining surfaces meet at the first discontinuous corner and at a second discontinuous corner.

5. A mount as defined in claim 2, wherein the continuous cut-out defining surfaces are continuously curved.

6. A mount as defined in claim 2, wherein the continuous cut-out defining surfaces are arcuate.

7. A mount as defined in claim 5, wherein the continuous cut-out defining surfaces comprise different radii of curvature.

8. A mount as defined in claim 5, wherein the continuous cut-out defining surfaces comprise different centers of curvature.

9. A mount as defined in claim 2, wherein the elasticity-enhancing cutouts each comprise a generally crescent-shaped cross section in a cross-sectional direction orthogonal to the wheel axis.

10. A mount as defined in claim 1, wherein:
    each one of the elasticity-enhancing cutouts is defined by a cut-out defining surface;

the cut-out defining surface comprises a first arcuate portion and a second arcuate portion connected to the first arcuate portion by a pair of spaced apart discontinuities; and the first arcuate portion and the second arcuate portion comprise different centers of curvature.

11. A mount as defined in claim 1, wherein:

each one of the elasticity-enhancing cutouts is defined by a cut-out defining surface;

the cut-out defining surface comprises a first arcuate portion and a second arcuate portion connected to the first arcuate portion by a pair of spaced apart discontinuities; and the first arcuate portion and the second arcuate portion comprise different radii of curvature.

12. A mount as defined in claim 1, wherein each one of the elasticity-enhancing cutouts is defined, at least in part, by a plurality of continuous cut-out defining surfaces.

13. A mount as defined in claim 12, wherein at least one pair of the plurality of continuous cut-out defining surfaces meet at a discontinuous corner.

14. A mount as defined in claim 12, wherein the continuous cut-out defining surfaces are arcuate.

15. A mount as defined in claim 12, wherein the continuous cut-out defining surfaces each extend in a direction that is parallel to the wheel axis.

16. A mount as defined in claim 2, wherein the elasticity-enhancing cutouts are shaped or located such that any notional radial line between the wheel axis and the teeth intersects at least one pair of continuous cut-out defining surfaces having one or more discontinuities therebetween.

17. A mount as defined in claim 16, wherein at least one notional radial line intersects a second pair of continuous cut-out defining surfaces having one or more discontinuities therebetween.

18. A mount as defined in claim 1, wherein a ratio of the volume of the elasticity-enhancing cutouts to the volume of the worm wheel is between about 15% and about 45%, thereby providing a wheel body having a mass that is about 15% to about 45% lower than a mass that the wheel body would have if made from solid material.

19. A mount as defined in claim 1 wherein the base is movable relative to a base support component and the worm shaft is supported by the base such that movement of the base relative to the base support component causes corresponding movement of the worm axis and the wheel axis, while maintaining the orthogonality therebetween.

20. A worm gear assembly for use with a mount for a telescope or other optical instrument comprising a holder for supporting an optical instrument mounted thereto, operation of the worm gear assembly enabling the holder to move relative to a base about a wheel axis, the worm gear assembly comprising:

a worm wheel rigidly connected to the holder, such that movement of the worm wheel about the wheel axis causes corresponding movement of the holder about the wheel axis;

a worm shaft comprising a worm body extending in a longitudinal direction and a thread extending in a spiral on the worm body around a longitudinally oriented worm axis that is orthogonal to the wheel axis, the worm shaft supported by the base for rotational movement about the worm axis;

the worm wheel comprising a generally disc-shaped wheel body comprising a plurality of radially extending and circumferentially spaced apart teeth at a radially outermost peripheral surface for engaging the thread of the worm shaft, so that rotation of the worm shaft about the worm axis causes, by engagement of the teeth with the thread, corresponding rotation of the worm wheel about the wheel axis and corresponding relative rotation of the holder and the base about the wheel axis; and the wheel body shaped to define a plurality of elasticity-enhancing cutouts spaced apart from the wheel axis and extending through the wheel body in a directions parallel to the wheel axis.

* * * * *